C. HUTCHINS.
Corn-Planter.
No. 162,173. Patented April 20, 1875.
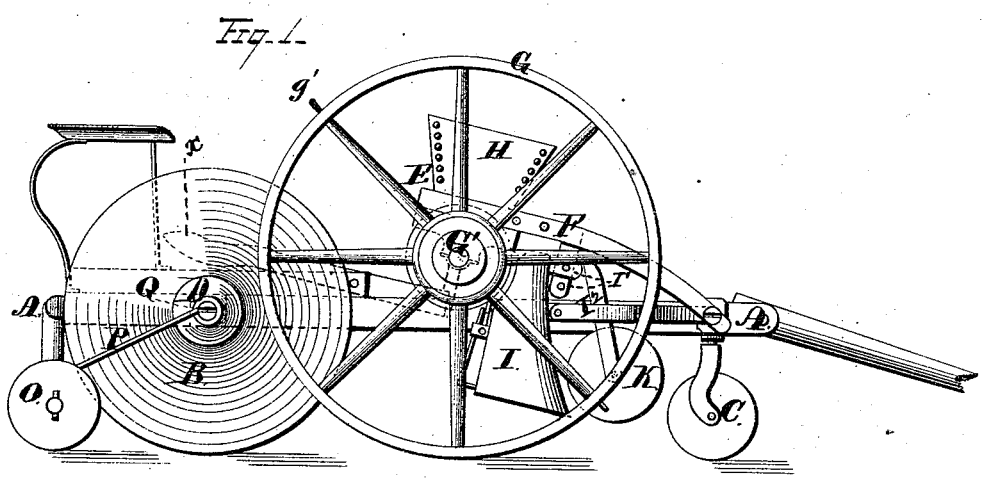
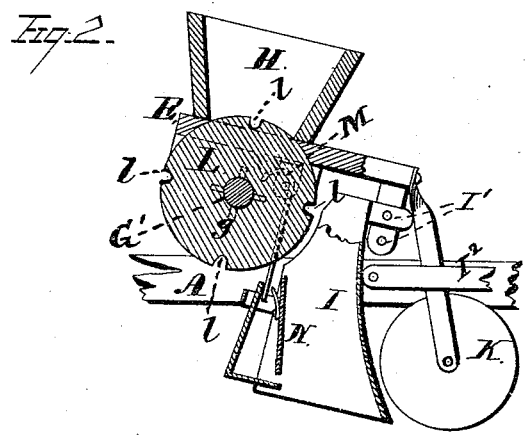

UNITED STATES PATENT OFFICE

CHARLES HUTCHINS, OF CARTHAGE, MISSOURI.

IMPROVEMENT IN CORN-PLANTERS.

Specification forming part of Letters Patent No. 162,173, dated April 20, 1875; application filed June 22, 1874.

*To all whom it may concern:*

Be it known that I, CHARLES HUTCHINS, of Carthage, in the county of Jasper and State of Missouri, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to certain improvements in corn-planters, by means of which the corn can be dropped with regularity from a point near the ground into hills at any convenient distance apart, and formed into rows indicated by a marker attached to the planter, which marks each successive row as the planter travels.

In the drawings, Figure 1 represents a side elevation of my planter; and Fig. 2, a sectional view of the plow, feed-wheel, and hopper.

My invention consists in certain combinations and arrangements of devices and appliances, as hereinafter set forth and claimed, wherein—

A represents the main frame of the planter, traveling on the wheels B at the rear, and a caster-wheel, C, at the front. D is the axle, in the present instance attached permanently to the frame A; but it may be hinged or pivoted to the same, if desired. E represents a swinging frame attached to the main frame A of the planter at its forward end by means of suitable arms F. Said frame carries the driving-wheels G of the planter, which are attached to a revolving axle, G', passing directly under the hoppers H, which are also attached to the swinging frame E. Said swinging frame also carries the hollow plows I, which are set slightly forward of the hopper, as shown, and a rotary or revolving cutter, K, directly in front of said plows. These plows are secured to the frame F by the connection I¹, and to the main frame A by a pivoted swinging bar, I², pivoted to the front of the plow and front of the main frame. The connection I¹ consists of a piece secured to the under side of the swinging frame F and a projecting piece on the front of the plow, the two secured together by a pin which passes through one of the holes in the piece attached to the frame F, by which means the hollow plow may be vertically adjusted to regulate the depth of furrow independent of the swinging frame F. The revolving axle G' carries the feed-wheels L, which are set directly under the hoppers. I employ, generally, two sets of hoppers, plows, and their attendant machinery, as shown.

The mechanism for dropping the corn is shown in detail in Fig. 2, and consists of the feed-wheels L, attached to the revolving shaft G' and moving with it, and the levers M N, the lever M being pivoted to the swinging frame E, and N to the plow I, as shown. The lever M is operated by cogs or pins $g$ on the axle G', and at regular intervals presses the top of the lever inward, throwing the lower end away from the plow and dropping the corn into the furrow made by said plow. The feed-wheel L has at its periphery a series of pockets, $l$, which correspond in number with the cogs on the axle, and serve to carry the grain from the hopper to the plow and drop it at proper intervals into the same. These pockets are of sufficient size to carry the proper quantity of grain to the plows for each hill, and they may be supplied with adjustable slides, or such a slide may be attached to the hopper above said wheel, so as to regulate the quantity, as may be desired.

The cutter K may, if desired, be provided with a scraper so arranged that it can be brought to bear against its sides by the driver to clear the same of dirt, &c., whenever necessary.

O represents the marker, consisting of a bar pivoted or hung at one end to the center of the rear part of the frame A, and provided at the other end with a revolving marking-wheel, $o$. To the said bar is attached a hook, P, which can be set into apertures Q on either side of the rear of the frame E, and thus bring the rotary marker to work on either side of the planter.

The driving-wheels G are provided with markers $g'$, made chisel-shaped and attached to the rim of the wheel, which serve to indicate to the operator whether the corn is being dropped with regularity at proper intervals. By dropping the corn from a few inches above the ground, so that no appreciable time will be occupied in falling, I am enabled to plant the corn regularly in rows when working both ways with different teams, which has hitherto been impossible, owing to the difficulty of gaging the two to work together, the time occupied by the falling of the corn, when dropped from a distance, allowing the faster team to lay the rows farther apart than the other, and thus giving rise to irregularity.

If at any time the driver finds he is out of line he can, by placing his foot on the lever, raise the front wheels off the ground and regulate as required.

The remaining portions of my apparatus are constructed in the ordinary manner, and need not be particularly described.

This invention is intended as an improvement on the patent granted to me October 21, 1873.

What I claim is—

1. In combination with the swinging frame E, attached to the main frame A by means of the arms F, the vertically-adjustable hollow plow I, attached to the pivoted swinging frame E by the connection $I^1$, and to the main frame A by the pivoted swinging bar $I^2$, provided with the dropping mechanism M N and revolving cutter K, all constructed, arranged, and adapted to operate as and for the purposes described.

2. The combination and arrangement of independently vertically-adjustable plows I $I^1$ $I^2$, swinging frame F, carrying the seeding mechanism L M, revolving cutter K, and main frame A, provided with the caster C, substantially as and for the purposes described.

In testimony that I claim the foregoing I have hereunto set my hand this 30th day of May, 1874.

CHARLES HUTCHINS.

Witnesses:
R. M. JONES,
E. K. PARRIS.